(12) United States Patent
Shimizu et al.

(10) Patent No.: US 11,827,416 B2
(45) Date of Patent: Nov. 28, 2023

(54) METALLIC BOTTLE CAN AND METHOD FOR PRODUCING THE SAME

(71) Applicant: TOYO SEIKAN CO., LTD., Tokyo (JP)

(72) Inventors: Yuusaku Shimizu, Yokohama (JP); Yasuhiro Yukawa, Yokohama (JP); Kouji Yamada, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 631 days.

(21) Appl. No.: 16/493,564

(22) PCT Filed: Mar. 22, 2018

(86) PCT No.: PCT/JP2018/011353
§ 371 (c)(1),
(2) Date: Sep. 12, 2019

(87) PCT Pub. No.: WO2018/174144
PCT Pub. Date: Sep. 27, 2018

(65) Prior Publication Data
US 2020/0010242 A1  Jan. 9, 2020

(30) Foreign Application Priority Data
Mar. 22, 2017 (JP) ................................ 2017-055789

(51) Int. Cl.
*B65D 23/08* (2006.01)
*B65D 23/02* (2006.01)
*B05D 3/02* (2006.01)
*B05D 3/12* (2006.01)
*B05D 7/14* (2006.01)
*B05D 7/22* (2006.01)
*B05D 7/24* (2006.01)
*C09D 163/00* (2006.01)
*B05D 7/02* (2006.01)

(52) U.S. Cl.
CPC ......... *B65D 23/0814* (2013.01); *B05D 3/02* (2013.01); *B05D 3/12* (2013.01); *B05D 7/02* (2013.01); *B05D 7/14* (2013.01); *B05D 7/22* (2013.01); *B65D 23/02* (2013.01); *C09D 163/00* (2013.01); *B05D 2202/25* (2013.01); *B05D 2259/00* (2013.01); *B05D 2504/00* (2013.01); *B05D 2508/00* (2013.01)

(58) Field of Classification Search
CPC .. B65D 23/0814; B65D 23/02; B65D 1/0207; B65D 23/0828; B65D 23/0807; B65D 3/12; B65D 7/14; B65D 7/42; B05D 3/02; B05D 3/12; B05D 7/14; B05D 7/22; B05D 7/24; B05D 2202/25; B05D 2259/00; B05D 2504/00; B05D 2508/00; B05D 3/0254; B05D 7/227; B05D 2202/00; B05D 2254/02; B05D 2701/00; C09D 163/00; B21D 51/2638
See application file for complete search history.

(56) References Cited

U.S. PATENT DOCUMENTS

| | | | | |
|---|---|---|---|---|
| 3,745,035 A | * | 7/1973 | Troughton et al. ...... | B05D 7/22 427/195 |
| 2001/0040167 A1 | * | 11/2001 | Flecheux .............. | B65D 1/0246 29/523 |
| 2005/0218140 A1 | * | 10/2005 | Enoki ...................... | B65D 7/04 220/62.22 |
| 2006/0099360 A1 | | 5/2006 | Farha | |
| 2010/0068433 A1 | | 3/2010 | Gibanel et al. | |
| 2013/0280455 A1 | | 10/2013 | Evans et al. | |
| 2016/0115346 A1 | * | 4/2016 | Nagai .................. | C09D 167/02 428/458 |

FOREIGN PATENT DOCUMENTS

| | | | |
|---|---|---|---|
| CN | 101048447 A | | 10/2007 |
| CN | 101517020 A | | 8/2009 |
| CN | 102858893 A | | 1/2013 |
| JP | 2001-019877 A | | 1/2001 |
| JP | 2002-355924 A | | 12/2002 |
| JP | 2006-007154 A | | 1/2006 |
| JP | 2006-137846 A | | 6/2006 |
| JP | 2006137846 A | * | 6/2006 |
| JP | 2008-56350 A | | 3/2008 |
| JP | 2008-56846 A | | 3/2008 |
| JP | 2010-17979 A | | 1/2010 |
| JP | 2010-267937 A | | 11/2010 |
| JP | 2014-118432 A | | 6/2014 |

OTHER PUBLICATIONS

International Search Report for PCT/JP2018/011353 dated May 29, 2018 [PCT/ISA/210].
Communication dated Jul. 3, 2020, from The State Intellectual Property Office of the P.R. of China in Application No. 201880019506.3.
Communication dated Feb. 4, 2022, issued by the Japanese Patent Office in application No. 2019-506962.

* cited by examiner

*Primary Examiner* — Alexander M Weddle
(74) *Attorney, Agent, or Firm* — Sughrue Mion, PLLC

(57) ABSTRACT

A metallic bottle can including a metallic base material of the bottle shape that has a mouth portion having a threaded portion, a shoulder portion, a body portion and a bottom portion, wherein, on the outer surface of said mouth portion, a finishing varnish layer is provided directly on said metallic base material, and said finishing varnish layer has an MEK extractability of 2 to 8% by mass.

10 Claims, No Drawings

METALLIC BOTTLE CAN AND METHOD FOR PRODUCING THE SAME

CROSS REFERENCE TO RELATED APPLICATIONS

This application is a National Stage of International Application No. PCT/JP2018/011353 filed Mar. 22, 2018, claiming priority based on Japanese Patent Application No. 2017-055789 filed Mar. 22, 2017.

TECHNICAL FIELD

This invention relates to a metallic bottle can having a finishing varnish layer provided directly on the outer surface of a base material at the mouth portion thereof, and to a method for producing the same.

BACKGROUND ART

Metallic bottle cans (hereinafter often abbreviated as bottle cans) have been widely used as containers for containing alcohol beverages such as beer and the like and for containing soft drinks such as coffee and the like.

Bottle cans are, usually, produced according to the procedure described below. An aluminum sheet is formed into a can body of a bottomed cylindrical shape through the draw-ironing work (DI work). The can body is subjected to the step of applying a size coating material to improve the adhesiveness to the ink or to the finishing varnish layer followed by baking, the step of printing and applying a finishing varnish followed by baking, and the step of forming an inner surface coating followed by baking, successively. Thereafter, the can body is subjected to the step of necking work where the diameter of the can body is contracted at the opening portion and a cap-fitting portion is formed, and the step of threading work for forming a thread on the cap-fitting portion so that a cap can be screw-fit thereto.

In producing the bottle cans, a large load is exerted on the working region in the step such as of threading work. In this step, therefore, it becomes necessary to suppress the finishing varnish layer from being cracked or peeled. This is because water infiltrates through the cracks or the peeled portions during the retort-sterilization or the hot-storage (high temperature-storage) causing the finishing varnish layer to peel off. As for the bottle can that is finally obtained, on the other hand, it also becomes important to prevent the blocking between the film on the inner surface of the cap and the finishing varnish layer on the mouth portion of the bottle can in order to reduce the cap-opening torque so that the cap can be easily opened.

As means for satisfying these requirements simultaneously, a patent document 1 proposes a method for producing a bottle can by forming a size coating on a bottomed cylindrical formed body followed by baking, effecting a printing thereon except the threaded portion, applying thereon a coating material to which an anti-blocking agent has been added, subjecting the formed body to the necking and threading in a state where the coating on the outer surface thereof has been cured to a gel fraction of 80 to 96% and, after the threading work, subjecting at least the cap-fitting portion of the bottle can to the after-baking. The production method of the patent document 1 has features in that a size coating is formed to improve adhesiveness between the finishing varnish layer and the base material, the finishing varnish layer is baked but incompletely at the time of the threading work to maintain the finishing varnish layer flexible so as to prevent the occurrence of cracks or peeling and, finally, the finishing varnish layer is baked again to cure it in order to prevent the blocking between the film on the inner surface of the cap and the film on the outer surface of the mouth portion of the bottle can.

From the standpoint of forming the size coating, however, the production method of the patent document 1 requires the step of applying the size coating and the step of drying and baking. Besides, the coating material for size coating must be provided, arousing a problem of increased cost of production, such as cost of materials and cost of facilities.

PRIOR ART DOCUMENT

Patent Document

Patent document 1: JP-A-2006-007154

OUTLINE OF THE INVENTION

Problems That the Invention is to Solve

It is, therefore, an object of the present invention to provide a metallic bottle can that suppresses the finishing varnish layer from being cracked or peeled on the outer surface of the mouth portion of the bottle can and that can be produced at a reduced cost.

Means for Solving the Problems

According to the present invention, there is provided a metallic bottle can including a metallic base material of a bottle shape that has a mouth portion having a threaded portion, a shoulder portion, a body portion and a bottom portion, wherein:

on an outer surface of the mouth portion, a finishing varnish layer is provided directly on the metallic base material; and the finishing varnish layer has an MEK extractability of 2 to 8% by mass. on the outer surface of the mouth portion, a finishing varnish layer is provided directly on the metallic base material; and the finishing varnish layer has an MEK extractability of 2 to 8% by mass.

In the metallic bottle can of the present invention, the following embodiments are preferred.

(1) The finishing varnish layer has the MEK extractability of 7 to 8% by mass;

(2) The metallic bottle can is capable of being retort-sterilized;

(3) The base material is made from aluminum;

(4) The matrix of the finishing varnish layer is a mixed resin containing a polyester resin, an epoxy resin and an amino resin; and (5) The mixed resin contains no acrylic resin.

According to the present invention, further, there is provided a method for producing the metallic bottle can including steps of:

providing a metallic base material of a bottle shape that has a mouth portion having a threaded portion, a shoulder portion, a body portion, and a bottom portion;

applying, on an outer surface of the metallic base material, a coating material for forming a finishing varnish layer;

primarily baking the coating material for forming the finishing varnish layer;

applying, on an inner surface of the metallic base material, a coating material for forming an inner surface film after a primary baking has been finished;

forming the finishing varnish layer and the inner surface film by secondarily baking the coating material for forming the inner surface film and the coating material for forming the finishing varnish layer that has been primarily baked already; and executing a necking work and a threading work after a secondary baking has been finished;

the secondary baking being executed under such a baking condition that the finishing varnish layer acquires an MEK extractability of 2 to 8% by mass depending on the baking condition employed for the primary baking.

In the method for producing the metallic bottle can of the present invention, the following embodiments are preferred.

(6) The primary baking is executed at a temperature of 210 to 260° C. for a period of 60 to 120 seconds, and the secondary baking is executed at a temperature of 180 to 225° C. for a period of 50 to 140 seconds;

(7) The primary baking is executed at the temperature of 220 to 260° C. for the period of 60 to 120 seconds, and the secondary baking is executed at the temperature of 195 to 225° C. for the period of 80 to 140 seconds;

(8) The primary baking is executed at the temperature of 210 to 220° C. for the period of 60 to 80 seconds, and the secondary baking is executed at the temperature of 180 to 195° C. for the period of 50 to 110 seconds; and (9) The metallic base material having the bottle shape is a can body obtained through a draw-ironing work.

In the present invention, the MEK extractability (extractability with methyl ethyl ketone) represents a cured degree of the finishing varnish layer. The more the curing takes place, the less the unreacted components remain accounting for a decrease in the value of the MEK extractability. The MEK extractability of the finishing varnish layer of the mouth portion of the bottle can is measured by a method carried out in the Experimental Examples described later.

In the invention, further, the retort-sterilization stands for the sterilization under the application of pressure by being heated at not lower than 100° C. Concretely, it is carried out by the method described in the Experimental Examples appearing later.

Effects of the Invention

Despite of the absence of the size coating, the metallic bottle can of the present invention effectively suppresses the finishing varnish layer on the mouth portion from being cracked or peeled, and excels in cap openability requiring a small cap-opening torque. According to the inventors, the reason is because the finishing varnish layer has been cured to such a degree that the MEK extractability lies within a limited range (2 to 8% by mass). The finishing varnish layer of this kind has adhesiveness to the base material that is so high as to withstand severe working, and its hardness is so high as will not to cause blocking with the film on the inner surface of the cap. It is, therefore, allowed to obtain a bottle can that features both excellent adhesion of the film during the work and excellent cap openability without the need of providing the size coating and, besides, despite the finishing varnish layer has been cured prior to executing the necking work.

According to the method for producing the metallic bottle can of the present invention, the finishing varnish layer is provided directly on the base material via no size coating on the outer surface of the mouth portion of the bottle can. Therefore, the bottle can is produced at a reduced cost requiring neither the step of applying the coating material for forming the size coating nor the step of drying and baking. Moreover, absence of the step for drying and baking the coating material for forming the size coating helps decrease the frequency of heating, and brings about an advantage of avoiding a decrease in the strength of the base material caused by the heat.

MODES FOR CARRYING OUT THE INVENTION

The bottle can of the present invention includes a metallic base material of the bottle shape (hereinafter often referred to simply as base material) that has a mouth portion having a threaded portion for screw-engagement with a cap, a shoulder portion, a body portion and a bottom portion. Here, a finishing varnish layer is formed on the outer surface of the metallic base material at the mouth portion. So far as the above structure is possessed, the metallic base material of the bottle shape may be a can body that is integrally formed from the mouth portion up to the bottom portion, or may be a can body having the mouth portion and the body portion that are integrally formed and a bottom portion that is formed as a separate piece.

On the outer surface of the mouth portion, the finishing varnish layer is directly provided on the base material. Or, in other words, the finishing varnish layer is formed on the base material without forming such an underlying layer as size coating or an ink layer.

As the base material, there can be used any metal that has been used for the bottle cans without limitation. From the standpoint of workability, however, an aluminum base material can be preferably used. Aluminum includes pure aluminum, as a matter of course, and aluminum alloys as well.

In the invention, the finishing varnish layer on the outer surface of the mouth portion has an MEK extractability that is adjusted to lie in a range of 2 to 8% by mass. This assures excellent cap openability yet suppressing the finishing varnish layer from being cracked or peeled. Specifically, from the standpoint of assuring excellent cap openability, the MEK extractability is, desirably, 2 to 4% by mass. From the standpoint of highly suppressing the finishing varnish layer from being cracked or peeled, the MEK extractability should be 4 to 8% by mass. Further, from the standpoint of assuring cap openability, suppressing the finishing varnish layer from being cracked or peeled and, besides, effectively preventing the inner film from being peeled or cracked on the inner surface of the base material, it is most desired that the MEK extractability lies in a range of 7 to 8% by mass.

If the MEK extractability is too high, the finishing varnish layer is not cured to a sufficient degree and, therefore, undergoes the blocking with the film on the inner surface of the cap when the cap is to be opened. In this case, the cap can be opened but requiring a large torque; i.e., cap openability is impaired. If the MEK extractability is too low, on the other hand, the finishing varnish layer is cured to an excess degree and develops cracks or is peeled during the threading work, capping work or at the time of opening the cap. Moreover, the inner surface film may develop cracks during the heat treatment such as retort-sterilization.

The finishing varnish layer may be constituted by using a material known per se. so far as the MEK extractability lies in the above-mentioned range. As the matrix of the finishing varnish layer, there can be used, for example, polyester resin, epoxyacrylate resin, epoxy resin, acrylate resin, acrylic resin, amino resin or phenol resin. From the standpoint of easily controlling the degree of curing, however, there can be, favorably, used a mixed resin containing polyester resin, epoxy resin and amino resin. As the mixed resin, there can be, preferably, used a mixed resin of the non-acrylic type that contains no acrylic resin. More preferably, there can be used a mixed resin that selectively contains polyester resin, epoxy resin and amino resin. The above expression "contains no acrylic resin" is to mean not only that there is contained no acrylic resin by itself but also that there is contained no resin (e.g., epoxyacrylate resin) that may form an acrylic resin upon curing.

Depending upon the content contained therein, the bottle can of the present invention may be stored in a state of being heated at about 40 to about 60° C. (hereinafter often called "in a hot state") and may often be opened at a temperature the same as the temperature in the hot state. From the standpoint of more easily opening the cap in the hot state, the resin constituting the finishing varnish layer should have a glass transition point Tg which is, desirably, 51 to 60° C. and, more desirably, 53 to 58° C. When the glass transition point Tg is too high, the finishing varnish layer may crack or peel during the work. When the glass transition point Tg is too low, the cap in the hot state can be opened but requiring an increased torque.

Moreover, the finishing varnish layer may contain additives, such as known curing agents and catalysts.

The bottle can of the present invention, usually, has a film on the inner surface thereof to avoid contact between the metal and the content (beverage).

The film on the inner surface by itself may be the known one. The film can be formed by, for example, using a coating material comprising, as a resin component, epoxy resin, phenol resin, acrylic resin, urea resin, vinyl chloride resin, or copolymers thereof, though not limited thereto only. Specifically, the film on the inner surface is, in many cases, formed by using an epoxy/urea type resin coating material, an epoxy/phenol type resin coating material, an epoxy/acrylic/melamine type resin coating material or an epoxy/acrylic/phenol type resin coating material.

As described already, in the bottle can of the present invention, the finishing varnish layer has been cured to a degree that lies in the above-mentioned range in a stage prior to executing the necking work. Therefore, despite of the simplified steps of production without forming the size coating, it is made possible to suppress the finishing varnish layer from being cracked or peeled on the mouth portion that could be caused by the threading work. Therefore, even when the bottle can of the present invention is opened in a high temperature state after it was subjected to the heated conditions such as retort-sterilization and hot-storage (high temperature-storage), there is no probability that the film peels off.

That is, the metallic bottle can of the present invention can be retort-sterilized. In fact, referring to Experimental Examples 1 to 11 appearing later, when opened at 60° C., the finishing varnish layer had been peeled off in quite none of the bottle cans of the present invention. As for cracks in the finishing varnish layers, further, there were no large cracks but only very small cracks. When evaluated as the products, therefore, the bottle cans were all of a permissible quality.

Further, upon selecting suitable temperatures and times as baking conditions for forming the finishing varnish layer on the outer surface of the base material and forming the film on the inner surface thereof, the bottle can of the present invention features excellent cap openability.

For example, as demonstrated in Experimental Examples appearing later, the base material of the bottle can was made of an aluminum alloy and the base material of the screw cap was also made of the aluminum alloy. The bottle can was filled with the tap water, fitted with the screw cap, subjected to the retort-sterilization (heat-treatment with heated steam) at 125° C. for 30 minutes followed by storage at 60° C. for 24 hours, and was opened at 60° C. In this case, the cap-opening torque was less than 150 N·cm. From the standpoint of opening the cap more easily, the cap-opening torque should, desirably, be less than 140 N·cm and should, more desirably, be less than 120 N·cm.

The bottle can having the above-mentioned features of the present invention can be produced through the following steps.

Step of providing a metallic base material;
Step of applying a coating material for forming a finishing varnish layer;
Step of executing the primary baking;
Step of applying a coating material for forming an inner surface film;
Step of executing the secondary baking; and
Step of necking work and the threading work.

First, an aluminum alloy sheet (JIS 3104 alloy) of a thickness of, for example, 0.35 to 0.40 mm is punched into a circular blank. The circular blank is formed into a cup which is then draw-ironed into a bottomed cylindrical body. The opening portion of the bottomed cylindrical body is trimmed into a predetermined height to obtain a can body that serves as a metallic base material. The can body is washed and dried.

Next, based on the known methods, the can body is printed on the side surface thereof except the region that becomes the mouth portion of the bottle can, and is applied with the coating material to form the finishing varnish layer on the whole side surface thereof inclusive of the region that becomes the mouth portion. The composition of the coating material is determined by taking into consideration the kinds and amounts of the resins, and the amounts of the additives such as catalyst and curing agent such that the finishing varnish layer on the mouth portion acquires the MEK extractability that lies within the above-mentioned range.

There is no specific limitation on the thickness of the layer of the coating material for forming the finishing varnish layer. Usually, however, the coating material is applied by a known method such as roll coating or the like in such an amount that the thickness of the film after the secondary baking (described later in detail) is 2 to 7 μm.

The primary baking is to bake the coating material for forming the finishing varnish layer. In the step of this baking, there has not yet been formed the finishing varnish layer having the above-mentioned MEK extractability. This is because if the finishing varnish layer having a predetermined MEK extractability is formed in this step, then the next baking (secondary baking) for forming the inner surface film causes the MEK extractability of the finishing varnish layer to so decrease as to fall outside the range of the present invention.

After the primary baking is conducted, the coating material for forming the inner surface film is applied onto the inner surface of the metallic base material (can body) followed by the secondary baking.

Due to the secondary baking, there are formed the finishing varnish layer and the inner surface film.

As will be understood from the above description, the finishing varnish layer is formed through the two steps, i.e., the primary baking and the secondary baking. Therefore, the baking conditions are so set that the finishing varnish layer that is finally formed will have the MEK extractability that lies within the predetermined range. In the secondary baking, however, the coating material for forming the inner surface film is also baked. Accordingly, the conditions for the secondary baking must be set by also taking into consideration the properties of the inner surface film that is to be formed. This is because if the secondary baking is executed at an unnecessarily high temperature for an unnecessarily long period of time, then the inner surface film may tend to be decomposed and peeled off.

Therefore, the conditions for the primary baking are so set that the coating material for forming the finishing varnish layer is cured to a suitable degree and that the predetermined MEK extractability is attained due to the curing by the subsequent secondary baking. Here, the conditions for the primary baking must be so set that the properties of the inner surface film are not deteriorated by the secondary baking.

For example, the conditions for the primary baking can be selected within ranges of a temperature of 210 to 260° C. and a time of 60 to 120 seconds from the standpoint of the cured degree of the finishing varnish layer. Depending on the conditions for the primary baking that are selected, the conditions for the secondary baking are suitably selected within ranges of a temperature of 180 to 225° C. and a time of 50 to 140 seconds so that the predetermined MEK extractability (2 to 8% by mass) can be obtained.

In the invention, specifically, when it is attempted to obtain a bottle can having a very favorable cap openability, it is desired to execute the primary baking at a relatively high temperature for an extended period of time. For instance, it is desired to execute the primary baking at 220 to 260° C. for 60 to 120 seconds and, more preferably, at 230 to 250° C. for 70 to 105 seconds. Depending upon the conditions of the primary baking, the conditions of the secondary baking can be selected within ranges of 195 to 225° C. for 80 to 140 seconds, preferably, 200 to 225° C. for 80 to 140 seconds and, more preferably, 205 to 220° C. for 90 to 100 seconds.

Moreover, when it is attempted to more effectively prevent the inner surface film from being peeled off during the retort-sterilization, it is desired to execute the secondary baking at a relatively low temperature for a short period of time. For instance, it is desired to execute the secondary baking at 180 to 195° C. for 50 to 110 seconds.

The above-mentioned primary baking and the secondary baking are both executed, desirably, by using a body oven. In the customary steps of producing the bottle cans, a pin oven is used to execute the primary baking. That is, a can is put on a pin that is interlocked to a coating machine and is passed through the oven so as to be baked. In this case, however, if the operation of the coating machine is discontinued unexpectedly, then the pin, too, comes into a halt being interlocked thereto. On the other hand, the body oven used for the primary baking of the present invention does not permit the can bodies removed from the pins of the coating machine to come in contact with each other, but works to arrange the can bodies maintaining a predetermined distance at the entrance of the oven conveyer. Namely, the body oven works independently of the working condition of the coating machine making it, therefore, possible to correctly control the baking temperature and the time. It is, therefore, desired to set the temperature in the oven and to adjust the speed of the conveyer by using the body oven such that the temperature in the oven and the baking time lie within the above-mentioned numerical ranges.

The coating material for forming the finishing varnish layer is applied on the outer surface and is baked as described above followed by the secondary baking to cure it. There is thus formed the finishing varnish layer having the MEK extractability that lies within the above-mentioned range on the region corresponding to at least the threaded portion on the outer surface of the mouth portion. The thus obtained can body is, thereafter, subjected to the necking work a multiplicity of times. Through the necking work, the upper part of the can is contracted to a desired diameter due to the die necking. The degree of contracting the diameter is suitably determined depending on the diameter of the mouth portion of the bottle can and the capacity thereof.

Next, the can body is subjected to the threading work. Thereafter, the curling work is executed for the end of the mouth portion. From the necking work up to the curling work, as required, the region corresponding to the mouth portion may be heated or warmed by using a known means. By heating or warming the mouth portion at higher than the Tg of the finishing varnish, elongation or follow-up property of the film can be increased to more effectively suppress the finishing varnish layer from being cracked or peeled during the severe work such as threading work. Concretely speaking, the region corresponding to the mouth portion should be heated or warmed prior to the threading work so that the mouth portion can be threaded and curled in a state where the mouth portion is being heated at a temperature of 50 to 100° C. and, more preferably, 70 to 90° C.

The bottle can of the present invention can be produced by the above-mentioned production method. However, the production method is in no way limited thereto only and its design can be modified in a variety of other ways. For instance, the order of the steps may be reversed depending on the facilities in the plant. Moreover, there may be, further, added the step of providing an underlying layer between the base material and the printed layer in the body portion of the bottle can.

Further, the coating material for forming the finishing varnish layer may be applied onto the whole outer surface of the metallic base material. According to the present invention, however, it suffices if the finishing varnish layer formed on the outer surface of the threaded portion of the bottle mouth portion has the MEK extractability that lies within the predetermined range.

EXAMPLES

Measurement

Measuring the MEK Extractability

By using the concentrated sulfuric acid, the film was removed from the inner surface of the obtained bottle can. The bottle can was then washed with water and dried. The threaded portion of the bottle can was cut into a test piece of 30 mm×30 mm, which was then weighed (A). Next, the test piece after weighed was dipped in the MEK (methyl ethyl ketone) which was then boiled and refluxed for one hour. After refluxed, the test piece was washed two times with the unused MEK, and was dried and then weighed (B). By using the concentrated sulfuric acid, the finishing varnish layer was removed from the test piece that has been weighed. The test piece was then washed with water, dried and weighed (C). From the weighed numerical values, the extractability was calculated in compliance with the following formula.

$$\text{MEK extractability (\% by mass)} = 100 \times (A-B)/(A-C)$$

wherein A is a mass of the test piece of before the extraction, B is a mass of the test piece after the extraction, and C is a mass of the test piece after the finishing varnish layer has been removed.

The MEK extractability of the region corresponding to the threaded portion of before the threading work was measured in the same manner as for the threaded portion.

Evaluation

Evaluating the Cap Openability

400 Grams of tap water heated at 65° C. was introduced into the obtained bottle can, and a cap was wrap-seamed therewith in a nitrogen atmosphere in a manner that the pressure therein at 20° C. was 100 kPa. The cap that was used was made of an aluminum alloy of the JIS 5000 type, and the inner surface film was an epoxyphenol type resin. By using a steam type stationary retort apparatus, the bottle can was retort-sterilized by being heated at 125° C. for 30 minutes and was, thereafter, cooled with water to obtained a filled bottle can. The filled bottle can was then stored in an air-conditioned chamber maintained at 60° C. for one day. The cap-opening torque at 60° C. was measured by using a torque meter (model TNK-100B manufactured by Nidec-Shimpo Co.). Maximum cap-opening torques of the individual cans were regarded to be reference values of the individual cans. The smaller cap-opening torques that were measured, the more excellent the cap openability. Measurements were taken with N=5 cans, and the maximum values were evaluated in terms of the following four levels of poor, normal, good and very good based on the following references. Normal, good and very good were regarded to be the allowable levels.

Poor: Not less than 150 N·cm.
Normal: Not less than 140 N·cm but less than 150 N·cm.
Good: Not less than 120 N·cm but less than 140 N·cm.
Very good: Less than 120 N·cm.

Evaluating the Cracks and Peeling of the Finishing Varnish Layer on the Threaded Portion Filled bottle cans were prepared in the same manner as in the above-mentioned case of evaluating the cap openability, were stored at 60° C. in the same manner, and their caps were opened at 60° C. in the same manner. After the caps were opened, the threaded portions of the bottle cans were observed with the eye to evaluate the cracks and peeling of the finishing varnish layer on the threaded portions. Evaluations were made with N=5 cans and were judged in terms of the following four levels of poor, normal, good and very good based on the following references.

Here, the varnish peeling stands for a peeling over an area.
Further, from the state of observation with the eye, the normal, good and very good were regarded to be the allowable levels.

Poor: Not less than one can were peeled.
Normal: None of the 5 cans were peeled. No large cracks. Tiny cracks in 2 to 5 cans/5 cans.
Good: None of the 5 cans were peeled. No large cracks. Tiny cracks in 1 can/5 cans.
Very good: None of the 5 cans were peeled or cracked.

Evaluating the Cracks and Peeling of the Inner Surface Film on the Threaded Portion 400 Grams of a real content (coffee with milk or green tea) of normal temperature was introduced into the obtained bottle cans. In the same manner as in the above-mentioned case of evaluating the cap openability, a cap was wrap-seamed therewith. The bottle cans were retort-sterilized, and were cooled with water to obtain the filled bottle cans. The caps of the filled bottle cans were then opened at normal temperature to observe with the eye the inner surface film on the threaded portion of the bottle cans after their caps were opened. The bottle cans were evaluated for their cracks and peeling of the inner surface film. Evaluation was made for each of the contents with N=5 cans, and the bottle cans were judged in terms of the four levels of poor, normal, good and very good based on the following references. Further, from the state of observation with the eye, the normal, good and very good were regarded to be the allowable levels.

Poor: Not less than one can were peeled.
Normal: None of the 5 cans were peeled. No large cracks. Tiny cracks in 2 to 5 cans/5 cans.
Good: None of the 5 cans were peeled. No large cracks. Tiny cracks in 1 can/5 cans.
Very good: None of the 5 cans were peeled or cracked.

Experimental Example 1

A circular blank was punched from an aluminum alloy sheet JIS 3104 of a thickness of 0.38 mm. The circular blank was subjected to the drawing work and then to the redraw-ironing work to obtain a bottomed cylindrical body. The opening portion of the bottomed cylindrical body was trimmed to obtain a can body. Next, the can body was washed, dried, and was printed on the side surface thereof except the region that would become the mouth portion when it was formed into a bottle can. Further, a finishing varnish comprising, as the matrix resin, a mixed resin selectively containing a polyester resin, an epoxy resin and an amino resin, was applied onto the whole side surface of the can body inclusive of the region that becomes the mouth portion such that the film thickness after the secondary baking would become 4 μm. Next, the primary baking was executed in the body oven at 230° C. for 80 seconds. Thereafter, the inner surface of the can body was spray-coated with the coating material for forming the inner surface, and was subjected to the secondary baking at 220° C. for 95 seconds. The upper part of the can body was subjected to the necking work by repeating the die neck forming a multiplicity of times. Thereafter, the mouth portion was subjected to the threading work and, further, the end of the mouth portion was subjected to the curling work. There was thus formed a bottle can of a capacity of 400 ml having a can body diameter of 66 mmφ and a mouth diameter of 38 mmφ. The obtained bottle can was measured and evaluated to obtain the results as shown in Table 1. In this Example, the evaluation was not favorable concerning the cracks and peeling of the inner surface film on the threaded portion.

Experimental Example 2

A filled bottle can was prepared in the same manner as in Experimental Example 1 but executing the primary baking at 230° C. for 105 seconds and the secondary baking at 205° C. for 95 seconds. The filled bottle can was measured and evaluated to obtain the results as shown in Table 1.

Experimental Example 3

A filled bottle can was prepared in the same manner as in Experimental Example 1 but executing the primary baking at 230° C. for 105 seconds and the secondary baking at 220° C. for 95 seconds. The filled bottle can was measured and evaluated to obtain the results as shown in Table 1. In this Example, the evaluation was not favorable concerning the cracks and peeling of the inner surface film on the threaded portion.

Experimental Example 4

A filled bottle can was prepared in the same manner as in Experimental Example 1 but executing the primary baking at 250° C. for 70 seconds and the secondary baking at 220° C. for 95 seconds. The filled bottle can was measured and evaluated to obtain the results as shown in Table 1. In this Example, the evaluation was not favorable concerning the cracks and peeling of the inner surface film on the threaded portion.

Experimental Example 5

A filled bottle can was prepared in the same manner as in Experimental Example 1 but executing the primary baking at 250° C. for 105 seconds and the secondary baking at 220° C. for 95 seconds. The filled bottle can was measured and evaluated to obtain the results as shown in Table 1. In this Example, the evaluation was not favorable concerning the cracks and peeling of the inner surface film on the threaded portion.

Experimental Example 6

A filled bottle can was prepared in the same manner as in Experimental Example 1 but executing the primary baking at 215° C. for 70 seconds and the secondary baking at 190° C. for 80 seconds. The filled bottle can was measured and evaluated to obtain the results as shown in Table 1.

Experimental Example 7

A filled bottle can was prepared in the same manner as in Experimental Example 1 but executing the primary baking at 210° C. for 60 seconds and the secondary baking at 190° C. for 80 seconds. The filled bottle can was measured and evaluated to obtain the results as shown in Table 1.

Experimental Example 8

A filled bottle can was prepared in the same manner as in Experimental Example 1 but executing the primary baking at 220° C. for 80 seconds and the secondary baking at 190° C. for 80 seconds. The filled bottle can was measured and evaluated to obtain the results as shown in Table 1.

Experimental Example 9

A filled bottle can was prepared in the same manner as in Experimental Example 1 but executing the primary baking at 215° C. for 70 seconds and the secondary baking at 180° C. for 50 seconds. The filled bottle can was measured and evaluated to obtain the results as shown in Table 1.

Experimental Example 10

A filled bottle can was prepared in the same manner as in Experimental Example 1 but executing the primary baking at 215° C. for 70 seconds and the secondary baking at 195° C. for 110 seconds. The filled bottle can was measured and evaluated to obtain the results as shown in Table 1.

Experimental Example 11

A filled bottle can was prepared in the same manner as in Experimental Example 1 but executing the primary baking at 215° C. for 70 seconds and the secondary baking at 175° C. for 80 seconds. The filled bottle can was measured and evaluated to obtain the results as shown in Table 1.

TABLE 1

| | Baking conditions | | MEK extractability (% by mass) | | Evaluation (after retort-sterilized, opened at 60° C.) | | Evaluation (after retort-sterilized, opened at normal temp.) |
| --- | --- | --- | --- | --- | --- | --- | --- |
| | | | | | | After opened, cracks or peel of | After opened, cracks or peel of |
| | Primary baking | Secondary baking | Before threading | After threading | Cap openability | finishing varnish | inner film on threaded portion |
| Ex. 1 | 230° C., 80 sec. | 220° C., 95 sec. | 6 | 6 | good | very good | poor |
| Ex. 2 | 230° C., 105 sec. | 205° C., 95 sec. | 5 | 5 | good | very good | normal |
| Ex. 3 | 230° C., 105 sec. | 220° C., 95 sec. | 4 | 4 | very good | very good | poor |
| Ex. 4 | 250° C., 70 sec. | 220° C., 95 sec. | 3 | 3 | very good | good | poor |
| Ex. 5 | 250° C., 105 sec. | 220° C., 95 sec. | 2 | 2 | very good | normal | poor |
| Ex. 6 | 215° C., 70 sec. | 190° C., 80 sec. | 8 | 8 | good | very good | very good |
| Ex. 7 | 210° C., 60 sec. | 190° C., 80 sec. | 8 | 8 | good | very good | very good |
| Ex. 8 | 220° C., 80 sec. | 190° C., 80 sec. | 7 | 7 | good | very good | very good |
| Ex. 9 | 215° C., 70 sec. | 180° C., 50 sec. | 8 | 8 | good | very good | very good |
| Ex. 10 | 215° C., 70 sec. | 195° C., 110 sec. | 8 | 8 | good | very good | very good |
| Ex. 11 | 215° C., 70 sec. | 175° C., 80 sec. | 9 | 9 | normal | good | very good |

The invention claimed is:

1. A metallic bottle can including a metallic base material of a bottle shape that has a mouth portion having a threaded portion, a shoulder portion, a body portion and a bottom portion, wherein:
   a finishing varnish layer is formed on a printed layer in a printed portion on an outer surface of said body portion, and is provided directly on said metallic base material on an outer surface of said mouth portion;
   said finishing varnish layer at the threaded portion has an MEK extractability of 2 to 8% by mass.

2. The metallic bottle can according to claim 1, wherein said finishing varnish layer has the MEK extractability of 7 to 8% by mass; and
   the MEK extractability of the finishing varnish layer is a value at the threaded portion.

3. The metallic bottle can according to claim 1, wherein said metallic bottle can is capable of being retort-sterilized.

4. The metallic bottle can according to claim 1, wherein said metallic base material is made from aluminum.

5. The metallic bottle can according to claim 1, wherein the a matrix of said finishing varnish layer is a mixed resin containing a polyester resin, an epoxy resin and an amino resin.

6. The metallic bottle can according to claim 5, wherein said mixed resin contains no acrylic resin.

7. A method for producing the metallic bottle can of claim 1, including the following steps in order:
   providing a bottomed cylinder through a draw-ironing work;
   trimming an opening portion of said bottomed cylinder to form a can body;
   applying a coating material for forming a finishing varnish layer on an outer surface of said can body;
   primarily baking the coating material for forming said finishing varnish layer on the outer surface under a first temperature and during a first time;
   applying said coating material for forming said finishing varnish layer on an inner surface of said can body;
   secondarily baking (i) the coating material for forming said finishing varnish layer on the outer surface of said can body and (ii) the coating material for forming the finishing varnish layer on the inner surface of said can body under a second temperature and during a second time; and
   executing a necking work and a threading work in order to obtain a metallic base material of a bottle shape that has a mouth portion having a threaded portion, a shoulder portion, a body portion, and a bottom portion,
   wherein the secondarily baking the coating material for forming said finishing varnish layer is executed so that the finishing vanish layer at the threaded portion formed by the threading work has an MEK extractability of 2 to 8% by mass, with proviso that said second temperature is lower than said first temperature.

8. The method of production according to claim 7,
   wherein the first temperature is in a range of 210 to 260° C., and the first time is in a range 60 to 120 seconds, and
   wherein the second temperature is in a range of 180 to 225° C., and the second time is in a range of 50 to 140 seconds.

9. The method of production according to claim 8,
   wherein the first temperature is in a range of 220 to 260° C. and the first time is in a range of 60 to 120 seconds, and
   wherein the second temperature is in a range of 195 to 225° C., and the second time is in a range of 80 to 140 seconds.

10. The method of production according to claim 8,
    wherein the first temperature is in a range of 210 to 220° C., and the first time is in a range of 60 to 80 seconds, and
    wherein the second temperature is in a range of 180 to 195° C., and the second time is in a range of 50 to 110 seconds.

* * * * *